US008423498B2

United States Patent
Helms, II et al.

(10) Patent No.: US 8,423,498 B2
(45) Date of Patent: Apr. 16, 2013

(54) SYSTEM AND ASSOCIATED METHOD FOR DETERMINING AND APPLYING SOCIOCULTURAL CHARACTERISTICS

(75) Inventors: Robert F. Helms, II, Sanford, NC (US); Raymond J. Morris, Pittsboro, NC (US)

(73) Assignee: Integrated Training Solutions, Inc., Sanford, NC (US)

( * ) Notice: Subject to any disclaimer, the term of this patent is extended or adjusted under 35 U.S.C. 154(b) by 530 days.

(21) Appl. No.: 12/718,219

(22) Filed: Mar. 5, 2010

(65) Prior Publication Data

US 2010/0325082 A1 Dec. 23, 2010

Related U.S. Application Data

(63) Continuation-in-part of application No. 12/488,881, filed on Jun. 22, 2009.

(51) Int. Cl.
*G06F 9/44* (2006.01)
*G06N 7/02* (2006.01)
*G06N 7/06* (2006.01)

(52) U.S. Cl.
USPC .......................................................... 706/52

(58) Field of Classification Search ........................ None
See application file for complete search history.

(56) References Cited

U.S. PATENT DOCUMENTS 5,251,131 A * 10/1993 Masand et al. .................... 704/9
7,567,949 B2 * 7/2009 Chaudhuri et al. .................. 1/1
2002/0107721 A1 8/2002 Darwent et al.
2003/0175667 A1* 9/2003 Fitzsimmons, Jr. ........... 434/236
2003/0187660 A1 10/2003 Gong
2005/0222811 A1 10/2005 Jakobson et al.
2006/0122903 A1 6/2006 Medrano et al.
2007/0008408 A1* 1/2007 Zehavi .......................... 348/143
2007/0143329 A1 6/2007 Vigen
2008/0044048 A1 2/2008 Pentland
2008/0273088 A1 11/2008 Shu et al.
2009/0144418 A1 6/2009 Alstyne et al.

* cited by examiner

*Primary Examiner* — Jeffrey A Gaffin
*Assistant Examiner* — Li-Wu Chang
(74) *Attorney, Agent, or Firm* — Womble Carlyle Sandridge & Rice, LLP

(57) ABSTRACT

A computer system and associated method are provided for analyzing a scenario task to determine contextual characteristics thereof. An analytical processing device parses the scenario task into parsed task requirements. An associative processing device associates each parsed task requirement with a task requirement identifier and a task requirement resolution factor, and associates the task requirement identifiers to define a task requirement model. A correlative processing device correlates the task requirement model with a database of scenario data elements, by correlating the task requirement identifiers and/or the task requirement resolution factors with the respective scenario data element identifiers and/or scenario resolution factors associated with the scenario data elements. A compilation processing device forms contextual characteristics having categories, attributes, parameters, and parameter values associated with the correlated scenario data element identifiers and scenario resolution factors, wherein the contextual characteristics cooperate to populate the task requirement model.

22 Claims, 5 Drawing Sheets

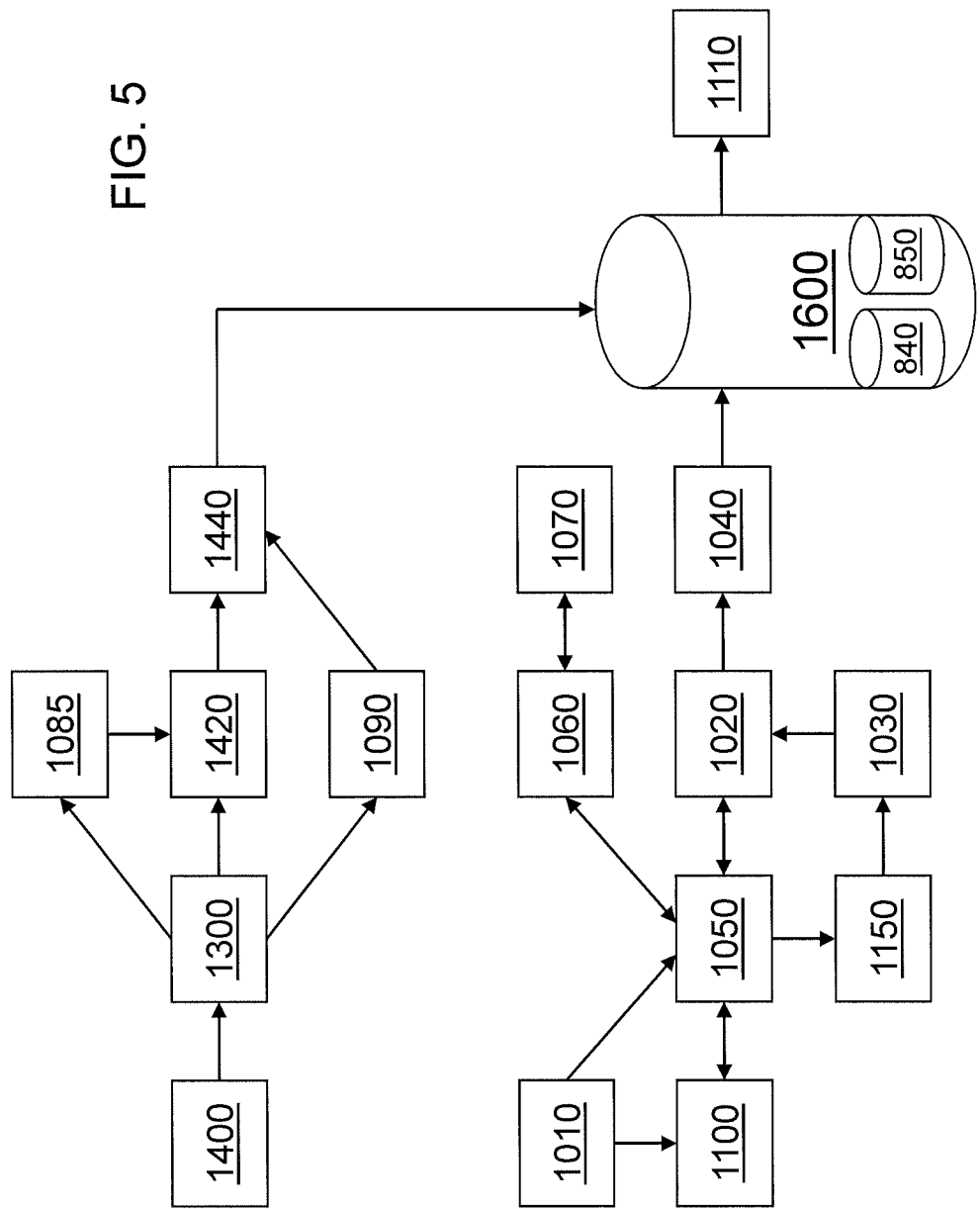

_US 8,423,498 B2_

SYSTEM AND ASSOCIATED METHOD FOR DETERMINING AND APPLYING SOCIOCULTURAL CHARACTERISTICS

CROSS-REFERENCE TO RELATED APPLICATION

This application is a continuation-in-part of U.S. patent application Ser. No. 12/488,881, filed Jun. 22, 2009, which is incorporated by reference herein in its entirety.

BACKGROUND OF THE DISCLOSURE

1. Field of the Disclosure

Aspects of the present disclosure relate to the evaluation of sociocultural characteristics and, more particularly, to a system and associated method for determining, evaluating, and/or applying sociocultural characteristics, for example, to determine contextual characteristics expected of a scenario task at least partially associated with a cultural group of human subjects.

2. Description of Related Art

There may be instances where accurate evaluation of a human subject may be critical for preventing consequential damages. For example, the security of a population may rely on an accurate evaluation of each person attempting to cross a border to enter that population. Often, the evaluation of those persons attempting to cross the border must be conducted by other humans (i.e., border guards), who may be relied upon to apply a criteria for permitting or denying entry to those persons. However, the border guard may not necessarily be able to discern whether or not the information provided by the person, such as responses, characteristics, mannerisms, etc., is reliable and meets the criteria for entry. In other instances, the border guard may not necessarily be able to discern whether the person is being truthful or deceptive.

In other instances, when presented with a scenario task, it may be desirable for those involved in carrying out that task to be made aware of the expected characteristics of that scenario. For example, a cross-border mission may have different characteristics if performed at night, instead of during the day. Cultural and/or communication aspects of the population on the other side of the border may be different from the side of the border from which the task originates. There may be different reactions of the population on the other side of the border depending on the nature or purpose of the task (i.e., a peaceful diplomatic visit vs. an armed raid for suspected militants). Further, the environmental conditions on the other side of the border may be different or the task may involve a different environment that may affect the experience of those carrying out the task (i.e., a flight-based reconnaissance mission vs. a ground-based exploration of a particular neighborhood).

As such, there exists a need for a system and/or method for determining and evaluating sociocultural characteristics, and applying such sociocultural characteristics, such that an objective or quasi-objective sociocultural evaluation of human subjects can be quickly and efficiently performed so as to allow those conducting a task to be made aware of the expected characteristics of particular scenarios or to allow expedited decisions to be rendered upon interaction with a particular human subject.

BRIEF SUMMARY OF THE DISCLOSURE

The above and other needs are met by aspects of the present disclosure which, according to one aspect, provides a computer system for analyzing a scenario task to determine contextual characteristics thereof. Such a system comprises an analytical processing device configured to parse a scenario task into parsed task requirements, with the scenario task being at least partially associated with a cultural group of human subjects. An associative processing device is configured to receive the parsed task requirements and to associate a task requirement identifier with each parsed task requirement, associate each parsed task requirement with a task requirement resolution factor, and associate the task requirement identifiers to define a task requirement model. A correlative processing device is configured to correlate the task requirement model with a database of scenario data elements, wherein each scenario data element has one of a scenario data element identifier and a scenario resolution factor associated therewith, by correlating one of the task requirement identifiers and the task requirement resolution factors with the respective one of the scenario data element identifiers and the scenario resolution factors. A compilation processing device is configured to compile the correlated scenario data element identifiers and scenario resolution factors to form contextual characteristics having categories, attributes, parameters, and parameter values associated with the correlated scenario data element identifiers and scenario resolution factors, wherein the contextual characteristics cooperating to populate the task requirement model.

Yet another aspect provides a method of analyzing a scenario task to determine contextual characteristics thereof. Such a method comprises parsing a scenario task into parsed task requirements, with the scenario task being at least partially associated with a cultural group of human subjects. A task requirement identifier is associated with each parsed task requirement, and each parsed task requirement is associated with a task requirement resolution factor. The task requirement identifiers are then associated to define a task requirement model. The task requirement model is correlated with a database of scenario data elements, wherein each scenario data element has one of a scenario data element identifier and a scenario resolution factor associated therewith, by correlating one of the task requirement identifiers and the task requirement resolution factors with the respective one of the scenario data element identifiers and the scenario resolution factors. The correlated scenario data element identifiers and scenario resolution factors are then compiled to form contextual characteristics having categories, attributes, parameters, and parameter values associated with the correlated scenario data element identifiers and scenario resolution factors, wherein the contextual characteristics cooperating to populate the task requirement model.

Aspects of the present disclosure thus provide significant advantages as otherwise detailed herein.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 4:
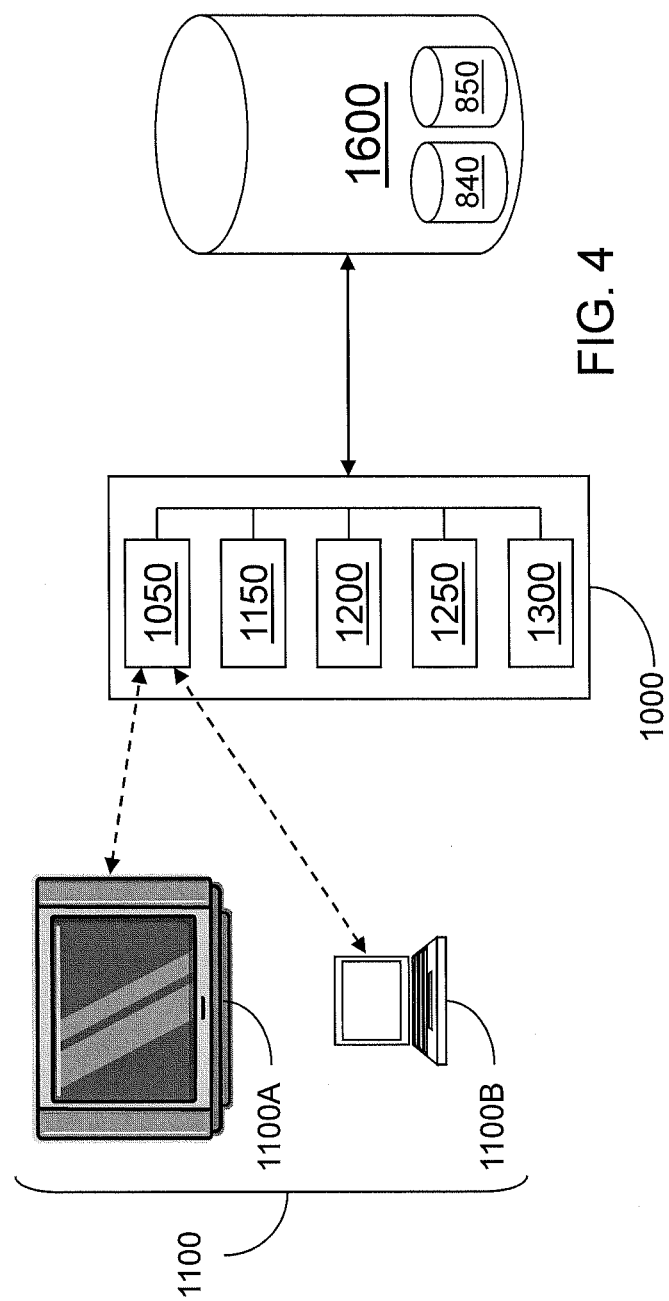

FIG. 4 is a schematic illustration of a system for determining and applying sociocultural characteristics, according to another aspect of the present disclosure; and FIG. 5 is a schematic illustration of an arrangement for establishing a database implemented by a system for determining and applying sociocultural characteristics, according to the aspect of the present disclosure illustrated in FIG. 4.

DETAILED DESCRIPTION OF THE DISCLOSURE

The present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

Figure 1:
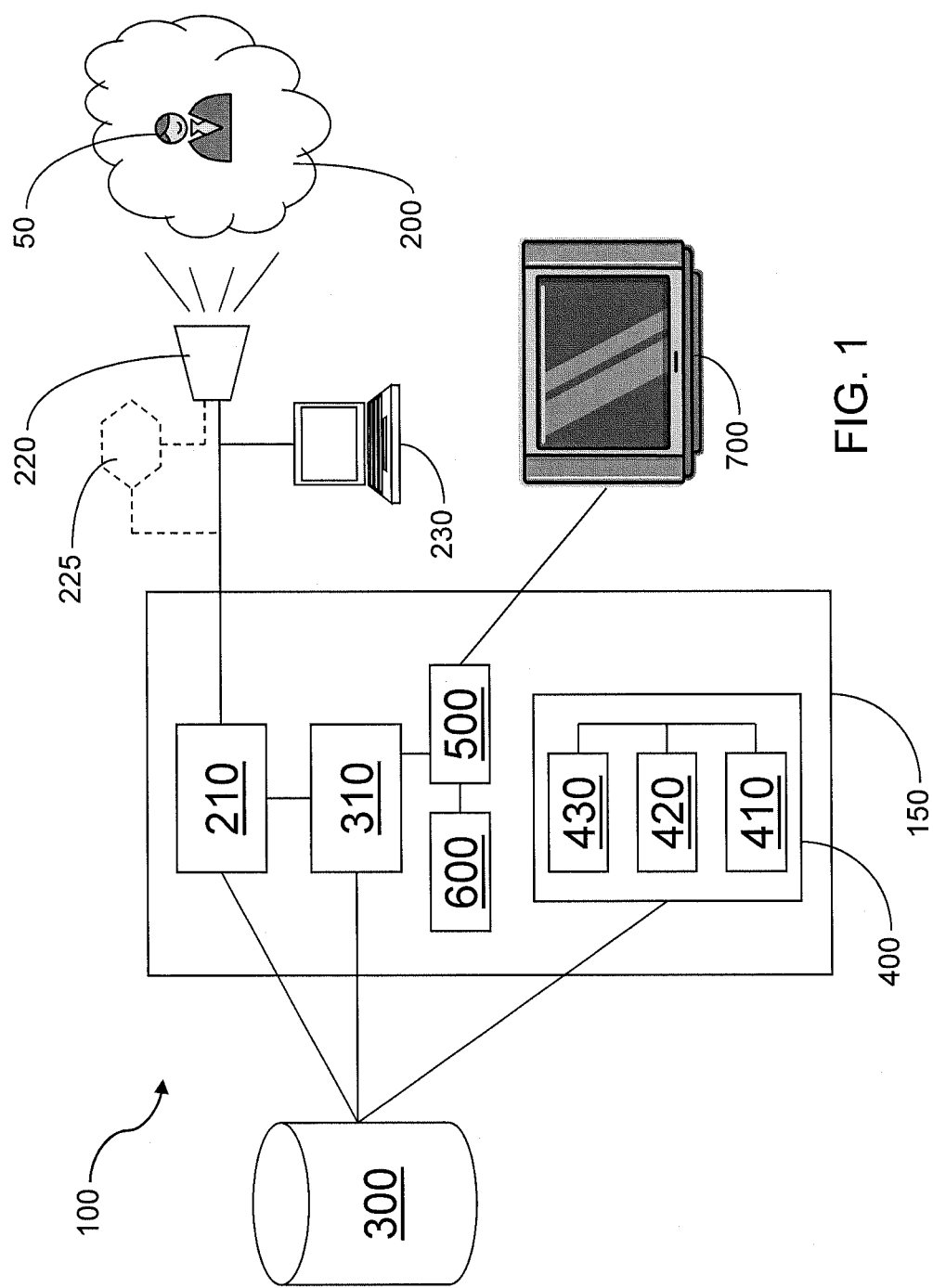
FIG. 1 is a schematic illustration of a system for determining and applying sociocultural characteristics, according to one aspect of the present disclosure.

FIG. 1 illustrates a system for determining and applying sociocultural characteristics, according to one aspect of the present disclosure, the system being indicated by the numeral 100. Such a system 100 can comprised of hardware, software, or a combination of software and hardware, as will be appreciated by one of skill in the art. For example, the system 100 can be generally associated with and/or comprised of software executed by one or more processing portions/modules of one or more computer devices, or by various computerized processing devices.

Figure 3:
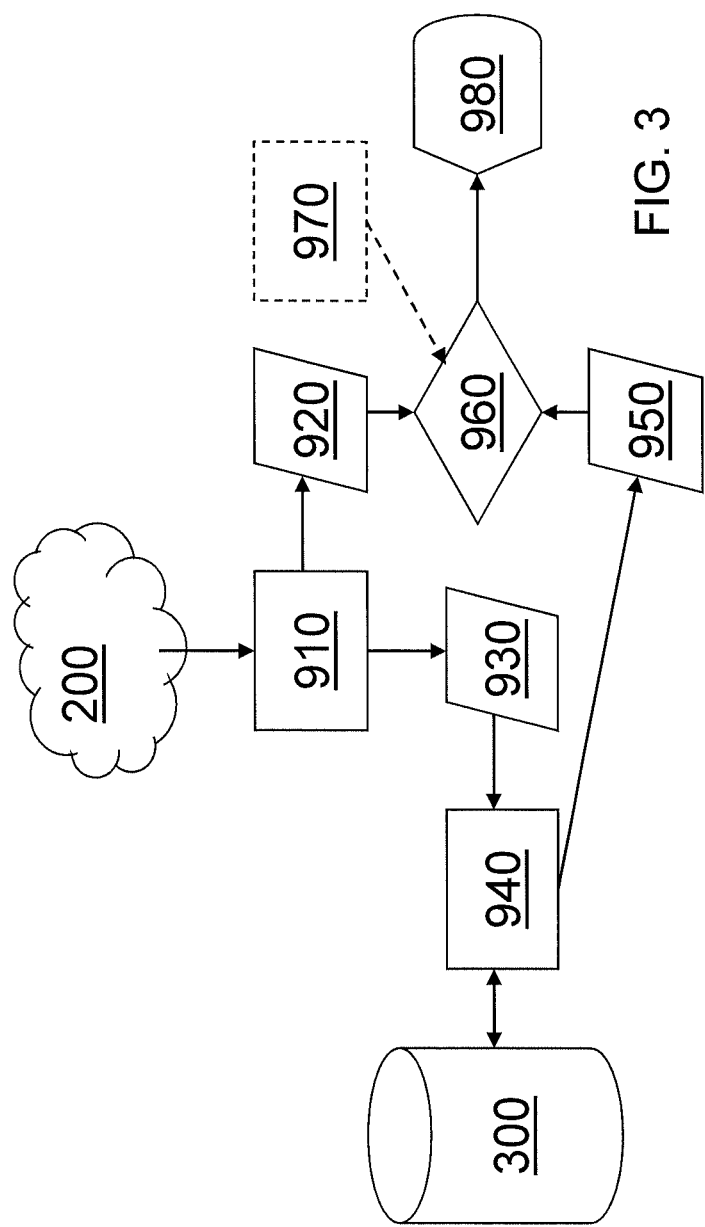
FIG. 3 is a schematic illustration of an arrangement for analyzing a communication sample, with respect to a database as shown in FIG. 2, using a system for determining and applying sociocultural characteristics, according to one aspect of the present disclosure.

More particularly, in one aspect, an exemplary system 100 may be configured to (1) receive, as input, a communication sample 200 such as categories, attributes, and/or raw audio (with or without partial transcription) and/or visual data associated with or at least partially originating from a particular target population or a target human subject (collectively element 50) belonging to that population (FIG. 3, element 910); (2) process the input to determine contextual/communicative data elements (FIG. 3, collectively element 930), apparent cultural data elements and/or apparent linguistic data elements (FIG. 3, collectively element 920) associated with the communication sample 200 obtained from the particular population/target human subject 50; (3) correlate at least the contextual data elements with a database 300 (FIG. 3, element 940) having data representing the particular population/target human subject 50, so as to determine a projected linguistic data element and/or a projected cultural data element (FIG. 3, collectively element 950) expected of a corresponding hypothetical human subject exhibiting at least the input contextual data elements; and (4) process the correlation by comparing one of the apparent cultural data element and the apparent linguistic data element with the corresponding one of the projected linguistic data element and/or the projected cultural data element associated with the corresponding hypothetical human subject (FIG. 3, collectively element 960) to determine whether the sociocultural event associated with the communication sample is consistent with the particular population/target human subject 50 and project analyzable indicia of such evaluated sociocultural characteristics associated with the correlation (FIG. 3, element 980) so as to allow further application of the determined results.

In this regard, aspects of the system 100 may implement an analytical processing device 210 configured to receive the communication sample 200 associated with the sociocultural event involving the particular population/target human subject 50. The communication sample 200 may take many different forms, such as categories, attributes, characteristics, mannerisms, textual data, audio data and/or visual data associated with or at least partially originating from a particular target population/target human subject 50. In receiving the communication sample 200, the analytical processing device 210 may implement an interaction interface device 220 configured to receive at least one of an audio sample, a video sample, and a textual sample associated with the sociocultural event. For example, the interaction interface device 220 may comprise a microphone device configured to receive an audio sample as audio data (e.g., speech emitted by the target human subject 50). In some instances, the interaction interface device 220 may comprise a transcription device 225 in communication with the microphone device for transcribing the audio data into textual data. As another example, the interaction interface device 220 may comprise an image capturing device configured to capture a still or moving video sample as video data (e.g., one or more images or a moving video of the target human subject 50). In some instances, the analytical processing device 210 may also include a supplemental input device 230 configured to allow appropriate demographic information, whether actual or approximated, associated with the target human subject 50 to be commensurately input and associated with the collected communication sample 200. For example, the demographic information (i.e., gender, age, ethnicity, nationality, etc.) may be observed and input by an operator using a supplemental input device 230 comprising an appropriate GUI device.

Example Scenario:

An individual (target human subject 50) approaching a checkpoint station is asked to respond to an elicitation from a guard. The guard asks a specific question and the spoken response (sociocultural event) of the individual is recorded via a microphone (interaction interface device 220), thereby providing an audio sample (communication sample 200) associated with the target human subject 50. The communication sample 200, via the microphone, is recorded in .wav format using an audio recording program running on a computer interface at the checkpoint station. The collected communication sample 200 may then be transmitted as audio data via a file transfer protocol (i.e., SFTP, though the data transfer capabilities and connectivity requirements may be determined by the particular application environment using, for example, modular components tailored to the requirements of the system 100) to a central location/computer device 150 (having the analytical processing device 210) where the audio sample (audio data) may also be stored. The same computer interface at the checkpoint station may also include an appropriate terminal device (supplemental input device 230) to allow an operator to enter approximate, reported, or actual demographic information associated with the individual (target human subject 50). The demographic information may, in turn be associated with and transmitted with the audio data to the central location. A database entry may then be created in a database in communication with the analytical processing device 210, with the database entry having a reference (file name) to the audio data/audio sample and any demographic information (i.e., gender, age, ethnicity, nationality, etc.) associated therewith.

Once the communication sample 200 is received via the interaction interface device 220, the communication sample 200 may be converted by the analytical processing device 210 into a processable format for facilitating determination of an apparent cultural data element, an apparent linguistic data element and/or a contextual data element therefrom, wherein the contextual data element may further include a communicative data element. That is, the communication sample 200 may then be analyzed/processed by the analytical processing device 210, for example, using a format agreement procedure/algorithm, to determine relevant communication metadata characteristics (i.e., the apparent cultural data element, the apparent linguistic data element and/or the contextual data element, including the communicative data element) defined, for example, by informed experts and/or included in a compilation of such metadata characteristics stored in an appropriate database. For example, the communication sample 200 may be analyzed using emergent theme analysis to generate a symmetrical matrix of apparent cultural and/or linguistic data elements (i.e., cultural and/or linguistic characteristics exhibited by or observed of the target human subject 50). The apparent cultural and/or linguistic data elements may further be time-related to each other so as to indicate, for instance, an observed/actual metadata profile of the target human subject 50. That is, certain cultural/linguistic indicia which appear in the communication sample 200 within a particular time span, such cultural/linguistic indicia being determined by informed expertise (i.e., an expert and/or through empirical observation), are annotated as having a positive coincidence within the communication sample 200. The annotated cultural/linguistic resultants may then be entered into or otherwise associated with the symmetrical apparent cultural/linguistic data element matrix. In this manner, any apparent cultural and/or linguistic data elements in the communication sample 200 are identified and annotated as appropriate metadata characteristics and used to form a corresponding table. The resulting table of the annotated metadata characteristics thus comprises the observed metadata profile of the target human subject 50.

Example Scenario:

The audio data of the audio sample collected from the target human subject 50 is analyzed by the analytical processing device 210 for the presence of multiple linguistic characteristics, including any consonant cluster reduction, therein (i.e., contextual data elements, including communicative data elements). For example, a wavelength analysis may be conducted using appropriate signal processing to determine any wavelength groups corresponding to reduced consonant clusters and/or other linguistic characteristics, corresponding to appropriate consonant clusters and linguistic characteristics included in a contextual/communicative data element database. A natural language processing component (transcription device) may also be implemented to generate a transcript of the audio sample. The generated transcript may be further analyzed for any apparent cultural/linguistic data elements corresponding to appropriate cultural/linguistic data elements included in a cultural/linguistic data element database. In some instances, each analysis may be configured for adaptive learning, whereby the results of such analyses are incorporated in to the respective contextual/communicative data element and cultural/linguistic data element databases such that subsequent analyses are better informed and progressively improved, even within a single communication sample 200.

Once the contextual data elements, including any communicative data elements, have been determined by the analytical processing device from the communication sample 200, the observed contextual/communicative data elements are then profiled according to empirically-determined data contained in an appropriate database 300, using a correlative processing device 310 in communication with the analytical processing device 210. More particularly, the correlative processing device 310 may be configured to receive the contextual and/or communicative data element, and to correlate the contextual/communicative data element with one of a projected cultural data element and a projected linguistic data element expected of a corresponding hypothetical human subject. In this manner, the contextual/communicative data element may be related to a projected metadata profile of the hypothetical human subject (i.e., a hypothetical human subject who would exhibit the contextual/communicative data element under similar circumstances).

Figure 2:
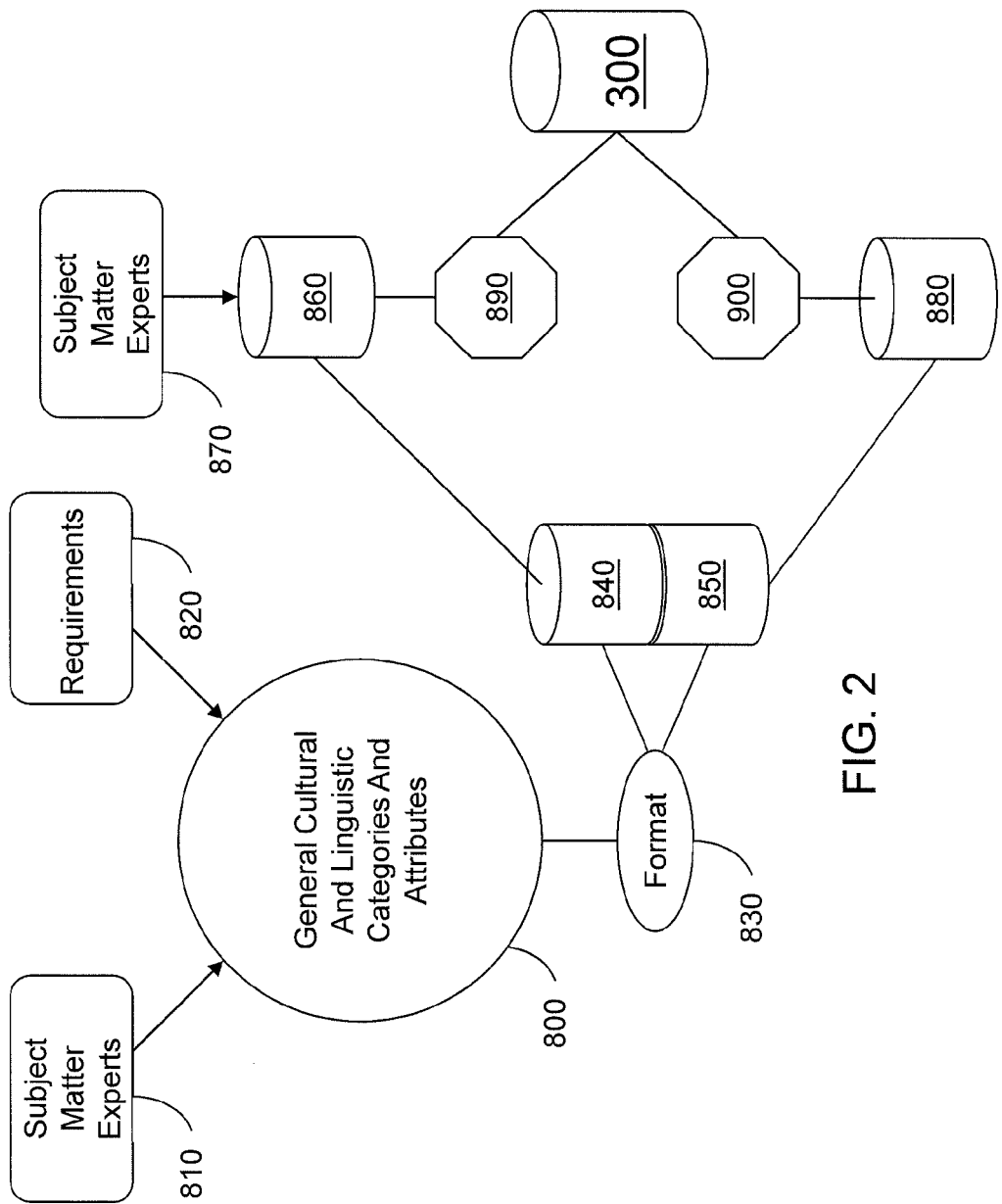
FIG. 2 is a schematic illustration of an arrangement for establishing a database implemented by a system for determining and applying sociocultural characteristics, according to one aspect of the present disclosure.

As such, one aspect of the present disclosure is directed to the database 300 and the manner in which it is formed and maintained, as shown, for example, in FIGS. 1 and 2. Since the database 300 provides the correlation source for the contextual/communicative data element of the communication sample 200 obtained from the target human subject 50, the data within the database 300 should be sufficient to establish or project a hypothetical human subject from a correlation of cultural/linguistic data element matrices of empirically-analyzed human subjects having similar metadata profiles. As such, the metadata characteristics of individual or group/population samples which populate the database 300 may be generated in a similar manner as for the observed target human subject 50, except that known or otherwise established control criteria are implemented to provide certainty to the information associated with the database-populating samples. Establishing the database 300 in this manner thus allows for a priori recognition of connections/correlations between samples based on, for example, demographic information and known or otherwise established affiliations.

More particularly, in one aspect, a data processing device 400 associated with the database 300 is configured to receive control communication samples from a defined cultural group of human subjects, the control communication samples including general linguistic and cultural categories and attributes 800 defined according to data collection requirements. Such control communication samples may be obtained, for example, from cultural, linguistic and application-specific subject matter experts 810 (i.e., opining with respect to a particular application or situation, or with respect to a particular language and/or culture, or with respect to sociology based on, for instance, gender, race, or nationality), and/or according to a particular requirement determination 820 (i.e., particular linguistic elements). Further, such control communication samples may be based, for example, on informed input determined by requirements and restrictions of particular applications and/or environment, and may thus be associated with a particular context of implementation or utilization. In addition, language and/or cultural categories, attributes, characteristics, mannerisms, application requirements, and technical advisories may be provided by informed sources/subject matter experts, and also associated with the control communication samples.

Once the raw data is collected, the data processing device 400 may be further configured to convert the control communication samples into a processable and extractable format using, for example, a communication format agreement procedure 830, in accordance with any applicable data requirements. The control communication samples may thus be further separated into control cultural characteristics 840 and control communicative characteristics/control linguistic characteristics 850. Further, in some instances, control source profiles formed from the control cultural characteristics and control communicative characteristics/control linguistic characteristics of the control communication samples, may comprise demographic determinants which, in turn, may be used to select other subsequent human subjects within the defined cultural group for additional control communication sample collection used to increase the scope and content of the database 300. In other instances, the established control source profiles may provide, for example, an investigation format and/or guided elicitations be used to gather communication samples 200 from appropriate target human subjects 50. When provided with such adaptive and learned controls, the database 300 may be continually expands through continued input of controlled data so as to form a continually evolving characterization of a conceptual sociological/cultural event.

A cultural data processing device 410, associated with and in communication with the data processing device 400, may be configured to associate the control cultural characteristics of the control communication samples with corresponding cultural data elements so as to define empirically-determined cultural data elements 860. Such cultural data elements may be obtained, for example, from subject matter experts 870 opining on particular cultures and/or languages associated with such cultures. Further, a communicative data processing device 420, also associated with and in communication with the data processing device 400, may be configured to associate the control communicative characteristics of the control communication samples with corresponding communicative data elements so as to define empirically-determined communicative data elements, and to associate the control linguistic characteristics of the control communication samples with corresponding linguistic data elements so as to define empirically-determined linguistic data elements (collectively 880).

A database processing device 430, in communication with the cultural data processing device 410 and the communicative data processing device 420, and also associated with the data processing device 400, may be configured to select control cultural data elements from the empirically-determined cultural data elements using a network analysis procedure 890 (i.e., attribute network analysis), and to combine the control cultural data elements to form a composite conceptual network defining social aspects of a projected cultural data element and/or projected linguistic data element. The database processing device 430 may be further configured to select control communicative data elements 900 from the empirically-determined communicative data elements and empirically-determined linguistic data elements, wherein the control communicative data elements define communicative aspects of the projected cultural data element and/or projected linguistic data element. The database processing device 430 may also be configured to correlate the control communicative data elements with the control cultural data elements by mapping the control communicative data elements with the composite conceptual network, wherein the control cultural data elements having the control communicative data elements mapped thereto may then be integrated so as to form the database 300.

With access to the database 300 developed and determined as disclosed, the communication sample 200 obtained from the target human subject 50 may then be analyzed by the analytical processing device 210, in some instances, at least partially using the empirically-determined data contained in the database 300, to determine the apparent cultural data elements and/or apparent linguistic data elements (including contextual and/or communicative data elements) demonstrated by the target human subject 50 in the communication sample 200.

Example Scenario:

An example apparent linguistic data element table (which may include contextual and/or communicative data elements) for an audio sample obtained from a target human subject 50 is shown below. The Boolean character "!" in the table denotes, for example, an utterance by the target human subject 50 which may demonstrate characteristics specific to a particular language or dialect, but do not necessarily correspond to the analysis model used by the analytical processing device 210 to analyze the communication sample 200.

| Attribute | Arabic | Gloss | Utterances | | | |
|---|---|---|---|---|---|---|
| | | General Arabic Colloquial | | | | |
| Interjection | يعني | "Umm" | 3.03.26 | 3.25.90 | 3.31.74 | |
| Lexicon | خلاص | "Complete"/"Done" | 3.21.67 | 3.22.36 | | |
| Lexicon | هين | "Here" | | | | |
| Lexicon | في | "There is" | 3.08.29 | | | |
| Lexicon | مش | "not" | | | | |
| Lexicon | تمام | "Good" | 3.01.12 | | | |
| | | Levantine Colloquial | | | | |
| Lexicon | ممكن | "Maybe" | 3.17.67 | | | |
| Grammar | ب + verb | Present tense prefix | 3.18.01 | 3.20.01 | | |
| Lexicon | عشان | "Because" | 3.30.24 | | | |
| Lexicon | هيك | "It is" | 3.30.44 | | | |
| Lexicon | بس | "But" | 3.24.05 | 3.40.36 | | |
| Lexicon | ما فيش | "There is not" | | | | |
| Consonant Shift | ث to ت | |th|-|t| | | | !3.10.01 | !3.06.11 |
| Consonant Shift | ق to ع | |q|-|'| | 3.04.66 | | | !3.096.55 |
| Consonant Shift | ث to ث | |th|-|z| | | | | |
| | | Other Colloquial (Egyptian) | | | | |
| Lexicon | بس | "But" | 3.24.05 | 3.40.36 | | |
| Lexicon | بوس | "Look" | | | | |
| Lexicon | ما فيش | "There is not" | | | | |

-continued

| Attribute | Arabic | Gloss | Utterances | |
|---|---|---|---|---|
| Consonant Shift | ج to غ | \|j\|-\|g\| | | !3.44.51 |
| Consonant Shift | ث to ت | \|th\|-\|t\| | !3.10.01 | !3.06.11 |

Once the apparent linguistic data elements of the communication sample 200 have been determined, the apparent linguistic data elements may be correlated by the analytical processing device 210 (in some instances, with the database 300) using, for example, an emergent theme analysis, to generate a matrix (in some instances, a symmetrical matrix) of apparent cultural data elements. That is, the analytical processing device 210 may be configured to receive the apparent linguistic data elements, and to correlate the apparent linguissources such as subject matter experts) may be annotated as having a positive coincidence. The annotated (i.e., binary) resultants may then be entered into the matrix of apparent cultural and/or linguistic data elements in association with the target human subject 50.

Example Scenario:

An example matrix of projected cultural and/or linguistic data elements associated with a target human subject 50 is shown below:

|  | Customs | Vast Difference | Way of Life | Arabness | Living | The Middle East | Limited | Limit in thinking |
|---|---|---|---|---|---|---|---|---|
| Customs |  | 1 | 1 | 1 |  |  |  |  |
| Vast Difference | 1 |  |  |  |  |  |  |  |
| Way of Life | 1 |  |  |  |  |  |  |  |
| Arabness | 1 |  |  |  |  |  |  |  |
| Living |  |  |  |  |  |  |  |  |
| The Middle East |  |  |  |  |  |  | 1 | 1 |
| Limited |  |  |  |  |  | 1 |  |  |
| Limit in thinking |  |  |  |  |  | 1 |  |  |
| Culture |  |  |  |  |  | 1 |  |  |
| Opinions |  |  |  |  |  | 1 |  |  |
| limit is the sky |  |  |  |  |  |  |  |  |
| No Limit |  |  |  |  |  |  |  |  |
| Egypt |  |  |  |  |  |  | 1 |  |
| Director/Manager |  |  |  |  |  |  |  |  |
| The Youth |  |  |  |  |  |  |  |  |
| Thinking/Way of thinking |  |  |  |  |  |  |  |  |
| The West |  |  |  |  |  | 1 | 1 | 1 |

|  | Culture | Opinions | limit is the sky | No Limit | Egypt | Director/Manager | The Youth | Thinking/Way of thinking | The West |
|---|---|---|---|---|---|---|---|---|---|
| Customs |  |  |  |  |  |  |  |  |  |
| Vast Difference |  |  |  |  |  |  |  |  |  |
| Way of Life |  |  |  |  |  |  |  |  |  |
| Arabness |  |  |  |  |  |  |  |  |  |
| Living |  |  |  |  |  |  |  |  |  |
| The Middle East | 1 | 1 |  |  |  |  |  |  | 1 |
| Limited |  |  |  |  | 1 |  |  |  | 1 |
| Limit in thinking |  |  |  |  |  |  |  |  | 1 |
| Culture |  |  |  |  |  |  |  |  | 1 |
| Opinions |  |  |  |  |  |  |  |  | 1 |
| limit is the sky |  |  |  |  |  |  |  |  |  |
| No Limit |  |  |  |  |  | 1 |  |  | 1 |
| Egypt |  |  |  |  |  |  |  |  |  |
| Director/Manager |  |  |  |  | 1 |  |  |  |  |
| The Youth |  |  |  |  |  |  |  | 1 |  |
| Thinking/Way of thinking |  |  |  |  |  |  | 1 |  |  |
| The West | 1 | 1 |  | 1 |  |  |  |  |  | tic data elements with an apparent cultural data element associated with the target human subject 50 to form a projected metadata profile of the target human subject 50. The apparent linguistic data elements may also be time-related to each other (i.e., relative association) to determine, for example, an apparent cultural profile of the target human subject 50. That is, particular data elements which appear in the communication sample 200 within a particular time span (wherein such relationship may be determined, for example, by informed Having determined the apparent cultural and/or linguistic data elements of the target human subject 50 from the communication sample 200, the contextual and/or communicative data elements in the communication sample 200 may be correlated with the database 300, for example, through relational queries of the various metadata profiles populating the database 300 using the correlative processing device 310, so as to determine a projected profile of the hypothetical human subject. That is, the correlative processing device 310 may be further configured to correlate the contextual and/or communicative data elements of the communication sample 200 with the database 300, comprising a plurality of empirically-determined communicative data elements associated with a plurality of empirically-determined cultural data elements and empirically-determined linguistic data elements. At least one of the empirically-determined cultural data elements, the empirically-determined linguistic data elements and the empirically-determined communicative data elements, which correlates with the contextual and/or communicative data elements of the communication sample 200, thus defines the projected cultural data element and/or the projected linguistic data element expected of the corresponding hypothetical human subject.

Example Scenario:

The target human subject 50, via the communication sample 200 may demonstrate contextual/communicative characteristics which may be related to a linguistic concept, such as consonant cluster reduction. Results which indicate a frequent reduction of final consonant |nd| clusters to |n| may provide certain contextual and/or communicative data elements which can be used by the correlative processing device 310 to correlate with other projected metadata profiles in the database exhibiting a similar percentile of final consonant cluster reductions. Those correlated metadata profiles in the database 300 may be further processed to determine the projected cultural and/or linguistic data elements of the archetypical profile (i.e., the projected hypothetical human subject) to which the observed/apparent cultural and/or linguistic data elements of the target human subject 50 can be compared and, in some instances, quantitatively analyzed, for conformity or disparity.

In some aspects, the projected profile of the hypothetical human subject may be generated, for example, by intercalating the metadata profiles (matrices) representing the projected profiles populating the database 300. Network analysis may then be conducted on the intercalated resultant matrix to determine any statistically significant (i.e., relevant) nodes using, for example, measures of statistical centrality. The relevant nodes may thus provide the archetypical profile (matrix) of the projected hypothetical human subject to which the apparent profile (the observed/apparent cultural and/or linguistic data elements) of the target human subject 50 can be compared.

Example Scenario:

Several types of network centrality measures can be generated for a metadata profile matrix, including:

Node Degree Centrality $$C_D(G) = \frac{\sum_{i=1}^{|V|} [C_D(v*) - C_D(v_i)]}{n-2}$$

Betweenness Centrality, where $\sigma_{st}$ is the number of shortest geodesic paths from s to t, and $\sigma_{st}(v)$ is the number of shortest geodesic paths from s to t that pass through a vertex v.

$$C_B(v) = \sum_{\substack{s \neq v \neq t \in V \\ s \neq t}} \frac{\sigma_{st}(v)}{\sigma_{st}}$$

and Eigenvector Centrality, where M(i) is the set of nodes that are connected to the $i^{th}$ node, N is the total number of nodes and $\lambda$ is a constant.

$$x_i = \frac{1}{\lambda} \sum_{j \in M(i)} x_j = \frac{1}{\lambda} \sum_{j=1}^{N} A_{i,j} x_j$$

Once the correlative processing device 310 determines the projected cultural data element and/or projected linguistic data element expected of a corresponding hypothetical human subject, a comparative processing device 500 in communication therewith is configured to compare the apparent cultural data element and/or the apparent linguistic data element of the target human subject 50 with the corresponding projected linguistic data element and/or projected cultural data element of the hypothetical human subject to determine whether or not the sociocultural event involving the target human subject 50 is otherwise consistent with the apparent sociocultural profile of the target human subject 50. In some instances, the comparison conducted by the comparative processing device 500 may result in a determined variance between the apparent and projected data elements/profiles, wherein the variance may be associated with an importance factor, and wherein a combination of the variance and the associated importance factor may be indicative of whether the sociocultural event is consistent with the target human subject. In such instances, the comparison may essentially be quantified to provide objective indicia of the evaluation of the target human subject 50 via the communication sample 200.

The projected profile of the hypothetical human subject may, in some instances, represent a compilation or reconstruction of empirically-determined metadata characteristics or attributes. As such, some characteristics or attributes may be relatively more important than others in the comparison between the apparent and projected profiles. Accordingly, particular levels of importance (i.e., as determined by informed sources, such as subject matter experts) may be applied at the characteristic/attribute level such that the profiles are appropriately weighted (FIG. 3, element 970). The status of the characteristic/attribute and the associated level of importance assigned thereto may be employed, in some instances, to indicate acceptable tolerances across central characteristics/attributes, whereby the tolerances may provide a range against which corresponding characteristics/attributes of the observed target human subject 50 can be compared (i.e., whether an attribute exhibited by the target human subject 50 falls within a particular range of the attribute which may be exhibited by the projected hypothetical human subject). In accomplishing this weighting function with respect to the comparison, a selective processing device 600, associated with the comparative processing device 500, may be configured to apply an importance weighting factor to the apparent cultural data element and/or the apparent linguistic data element. In some instances, an importance weighting factor may also be applied to the projected cultural data element and/or the projected linguistic data element. Such importance weighting factors are applied prior to the comparative processing device 600 comparing the apparent cultural data element and/or the apparent linguistic data element with the corresponding one of the projected cultural data element and/or the projected linguistic data element, so as to assign a relative importance to the data elements in determining the consistency of the sociocultural event with the target human subject 50 and to provide a quantitative relation therebetween.

Example Scenario:

A statistical comparison between characteristic/attribute networks or profiles (i.e., between apparent and projected characteristics/attributes) may be conducted using an unequal sample, unequal variance t-test:

$$t = \frac{\bar{X}_1 - \bar{X}_2}{s_{\bar{X}_1 - \bar{X}_2}}$$

where:

$$s_{\bar{X}_1 - \bar{X}_2} = \sqrt{\frac{s_1^2}{n_1} + \frac{s_2^2}{n_2}}$$

As discussed, the comparison/difference may be calculated by characteristic/attribute with an importance factor indicating characteristic/attribute significance. In some aspects, the importance factors may be obtained, for example, from informed sources such as subject matter experts, and included in the system 100/database 300 during the control profile formation procedure, where each characteristic/attribute may be associated with an importance factor. As will be appreciated by one skilled in the art, a higher importance factor for a particular characteristic/attribute may signify a smaller tolerance of deviation by the target human subject 50.

According to one aspect of the present disclosure, once the results of the comparison between the apparent and projected cultural and/or linguistic data elements have been determined by the comparative processing device 500, these results may be output as appropriate. In one example, the results of the comparison may be output via an interface device 700 configured to output data associated with the determined consistency. In further instances, the outputted data may be configured for further analysis with respect to a selected application. For example, the output may range, for example, from rationale tables to decisive action guides. In one instance, the output is provided by the interface device 700 in a humanly discernible form. The output and underlying analysis may also, in some instances, be stored as a data file which may be exported to selected applications, as necessary or desired, for further processing.

Example Scenario:

The checkpoint guard may be provided with a visually discernible response on a computer interface at the checkpoint station, or on a suitable portable platform which may be carried by the guard. The response may be in a binary form (i.e., yes/no, green/red, etc.). In some instances, the response may be configured to allow the guard to take immediate appropriate action. A support analyst/operator may also be provided with one or more displays which present apparent information relating to the target human subject 50, the projected information, and the variation between the apparent and projected information. This information may also include any applicable levels of importance, and may be presented in more than one form, including visual and textual representations, as necessary or desired.

As previously disclosed, the database 300 provides the correlation source for the contextual/communicative data element of the communication sample 200 obtained from the target human subject 50. As such, the data within the database 300 should be sufficient to establish or project a hypothetical human subject from a correlation of cultural/linguistic data element matrices of empirically-analyzed human subjects having similar metadata profiles. As such, the metadata characteristics of individual or group/population samples which populate the database 300 may be generated in a similar manner as for the observed target human subject 50, except that known or otherwise established control criteria are implemented to provide certainty to the information associated with the database-populating samples. Establishing the database 300 in this manner thus allows for a priori recognition of connections/correlations between samples based on, for example, demographic information and known or otherwise established affiliations.

Accordingly, in one aspect, a data processing device 400 associated with the database 300 is configured to receive control communication samples from a defined cultural group of human subjects, the control communication samples including general linguistic and cultural categories and attributes 800 defined according to data collection requirements. Such control communication samples may be obtained, for example, from cultural, linguistic and application-specific subject matter experts 810 (i.e., opining with respect to a particular application or situation, or with respect to a particular language and/or culture, or with respect to sociology based on, for instance, gender, race, or nationality), and/or according to a particular requirement determination 820 (i.e., particular linguistic elements). Further, such control communication samples may be based, for example, on informed input determined by requirements and restrictions of particular applications and/or environment, and may thus be associated with a particular context of implementation or utilization. In addition, language and/or cultural categories, attributes, characteristics, mannerisms, application requirements, and technical advisories may be provided by informed sources/subject matter experts, and also associated with the control communication samples.

More particularly, in particular aspects as shown in FIGS. 4 and 5, in order to determine the control communication samples (including general linguistic and cultural categories and attributes), the system may further comprise a computer system 1000 for first determining such communication samples based at least partially upon an analysis of one or more scenario tasks 1010 to determine contextual characteristics thereof, wherein each scenario task 1010 is at least partially associated with a cultural group of human subjects. In analyzing such scenario tasks, such a computer system 1000 may comprise an analytical processing device 1050 configured to parse a scenario task 1010 into parsed task requirements 1020 (and/or, in other instances, to combine task requirement concepts into a scenario task 1010). That is, a scenario task 1010 may be defined according to an operational scenario for a determined end-state, and such a definition may include particular tasks and conditions which must first be parsed in order, for example, to determine appropriate meta-information for further determination of appropriate parameters (i.e., task requirement portions or concepts). The particular tasks and conditions may include many different factors from many different perspectives such as, for example, factors determined from the region and/or culture of interest associated with the scenario task 1010, any goals or purposes associated with the scenario task 1010, and/or an experience profile of a reviewer/user of the data. Such particular task and conditions can also include events or influential factors related to task completion ranging, for example, from a regional political climate and current events, to local weather and time of day, or to any one or more of a linguistic element, a cultural element, a communication, an interaction, a condition, an environment, a purpose, and an effect. By parsing the tasks and conditions of the scenario task 1010 in this manner, each parsed task requirement 1020 may thus be associated with a different factor or combination of factors 1030 that later allows the corresponding aspects of the particular tasks and conditions of a projected application task 1040 to be changed and thus the resulting contextual output associated with that projected application task to be modified, as discussed further herein. More particularly, an associative processing device 1150 of the computer system 1000 may be configured to associate a task requirement identifier 1030, such as a key word, with each parsed task requirement 1020.

In other instances, the particular factors and conditions associated with a scenario task 1010 may be determined, for example, from available media including text or audio (i.e., "real world" media, such as deployment and mission objective statements provided in printed or electronic form, or recorded requirements delivered orally), or from cultural, linguistic and application-specific subject matter experts, and may be input into the analytical processing device 1050 of the computer system 1000 through, for example, a task requirements interface 1100 such as, for example, a touchscreen display 1100A or a computer terminal 1100B. In other instances, aspects of the particular tasks and conditions may be presented for selection according to key words 1030 associated therewith by the associative processing device 1150, whereby the selected combination of key words and associated requirements may be compiled, for example, into the scenario task 1010 and/or into the projected application task 1040. That is, in some instances, the task requirements interface 1100 may provide list-controlled concepts present in an scenario task dictionary 1060 through, for example, web/network delivery or on a local platform, in a manner that the possible input values can be controlled.

Because of the "mixed media" format of the particular factors and conditions and/or the task requirement concepts, any input may be processed using various tools, including automated speech recognition (ASR), text-mining, and optical character recognition (OCR). The input, associated concepts, and key words may then be established as one or more entries in or otherwise compared to existing entries in the scenario task dictionary 1060, thus providing "standardized" or otherwise system-appropriate task-based requirements 1020. The task-based requirements 1020 derived from the parsed scenario task 1010 indicated, for example, by the key words 1030, may then be provided via the task requirements interface 1100 to allow selection, correction, and modification of projected task requirements 1020 for a projected scenario task 1040. That is, the associative processing device 1150 may be further configured to associate the task requirement identifiers (i.e., key words) 1030, in some instances, to define a task requirement model or projected scenario task 1040. Since the selections are thus in standardized "system-appropriate" format, the result selections can then be directly implemented for further processing. Additionally, the task requirements interface 1100 may further be configured to be customizable, for example, according to the relative experience or sophistication of the user of the system as indicated, for instance, by a particular experience profile. Such customizable delivery of the task requirements 1020 to a user may also be implemented by the associative processing device 1150 (i.e., as a "task requirement resolution factor 1070" in the form of an importance level factor, a fidelity level factor, and/or an intercultural fidelity level factor associated with the task requirement 1020 and/or a projected information requirement level), and may thus allow the resolution of the information to correspond to the appropriate experience and needs of the user and, for instance, may allow data delivery defaults to be established in order to reduce repetition of commonly selected or corrected data. In this manner, the information presented by the task requirements interface 1100 may be configured to adapt, evolve, and improve as additional experience is added and as more information becomes available. As discussed further herein, in some instances where relevant data is not available, or the scenario task dictionary 1060 does not include appropriate data, gaps may be identified in the task requirement model 1040 which may require additional data to be obtained so as to provide a more complete and robust output.

One aspect of the present disclosure comprises a scenario task dictionary 1060 which, in some instances, may be configured as a sorting tool for associating parsed task requirements 1020 with system-appropriate task requirements for example, with respect to a standardized format. That is, the scenario task dictionary 1060 may be configured to facilitate the correlation of parsed task requirements 1020 into a processable and extractable format using, for example, a communication format agreement procedure, in accordance with any applicable data requirements. For example, the scenario task dictionary may be implemented in conjunction with ASR and/or OCR technology to parse key words from semi-constrained input media, wherein such key words parsed from "real world" scenario task or scenario sample description media, such as deployment and mission objective statements provided in printed or electronic form, or recorded requirements delivered orally, must be converted to a system-appropriate format for analysis. Text-parsing technologies may then be used to determine the parsed task requirements 1020, from which known task requirements may be extracted and compared to a library of primary task requirement entries, wherein the primary task requirement entries may be associated with the same scheme for querying and extracting appropriate data from a database 1600, as further disclosed herein, having the control cultural characteristics 840 and/or control communicative characteristics/control linguistic characteristics 850 stored therein.

A correlative processing device 1200, associated with the computer system 1000, is configured to correlate the task requirement model 1040 with scenario data elements 1080 in the database 1600 (wherein each scenario data element 1080 has one of a scenario data element identifier 1085 and a scenario resolution factor 1090 associated therewith), by correlating one of the task requirement identifiers 1030 and the task requirement resolution factors 1070 with the respective one of the scenario data element identifiers 1085 and the scenario resolution factors 1090. That is, once the task requirements 1020 have been determined from user input, the database 1600 is mined for appropriate parameters and parameter values 1110 for populating the task requirement model 1040 based, for example, on the task requirements 1020, the task requirement identifiers 1030, and/or the task requirement resolution factors 1070 in the form of, for instance, a "parameter extraction script" or otherwise a scheme for querying and extracting appropriate data from the database 1600. The relevant parameters and parameter values 1110 extracted from the database 1600 include a down-selection of data related to all applicable task requirements 1020 according to, for instance, the task requirement resolution factors 1070, for population of the task requirement model 1040, whereby particular task-necessary information is provided for illustrating the populated projected model.

In one aspect, the parameter extraction script may include appropriate data and parameter tags which are associated with data elements, fields and tables within the database 1600. The parameter tags may provide, for example, meta-information for query script variables, while the query script with populated variables may be applied to extract individual parameters and associated parameter values 1110 from the database 1600. Parameter values represent the data level providing details of the projected scenario task 1040 and are extracted after the corresponding defining parameters have been determined. In some instances, the parameters are selected by combining task requirements 1020 with task requirement resolution factors 1070 such as, for example, an intercultural proficiency level (IPL) factor of the user as determined from the user's profile. The parameter value or value range may then be extracted using, for example, an integrity level (LOI) factor and/or a fidelity level (LOF) factor. In some aspects, the relevant parameters may comprise a set of parameter values arranged and sorted according to a data classification protocol corresponding to particular resolution factors which function to reduce, define, and tailor data within the database 1600 to particular task requirements defining the task requirement model 1040. Different levels of down-selection provide an initial selection of data from the broader database, and then a differentiation of relevant candidate data from non-essential data for a specific application (i.e., divisions among languages or regions), followed by an adjustment of the overall size of the output data for populating the task requirement model 1040 through dynamic scaling customized to match scenario task requirements, output capabilities, and user needs and capabilities. Examples of resolution factors, such as IPL, LOI and LOF, are shown below in Tables 1-3:

TABLE 2

Level of Importance
Levels of Importance

| Value | Definition |
|---|---|
| 1 | Parameter is of very low importance and is a neutral factor in culturally accurate scenario task training |
| 2 | Parameter is of low importance and minimally contributes to culturally accurate scenario task training |
| 3 | Parameter is of medium importance and does have some contribution to culturally accurate scenario task training |
| 4 | Parameter is of high importance and should be included for culturally accurate scenario task training |
| 5 | Parameter is of very high importance and must be included for culturally accurate scenario task training |

TABLE 3

Level of Fidelity
Levels of Fidelity

| Value | Definition |
|---|---|
| 1 | Precision of operational representation of the culture parameter has marginal value for scenario task training |
| 2 | Operational representation of the culture parameter, even with great reduction, is acceptable for scenario task training |
| 3 | Operational representation of the culture parameter, even with some reduction, is acceptable for scenario task training |

TABLE 1

Intercultural Proficiency Level

| Intercultural Proficiency Level | Designator | Description |
|---|---|---|
| 0 | No intercultural competence | [individual] mostly lacks the awareness and/or knowledge of cultural patterns requisite for basic "survival" situations in the target cultural setting. |
| 1 | Limited intercultural competence | [individual] aware of the presence of, but not always able to identify, differences between his/her behavior and people from the target culture during simple interactions. Can usually deal with native speakers used to dealing with foreigners. May have difficulty with people not used to dealing with foreigners. |
| 2 | Minimum working level intercultural competence | [individual] has sufficient knowledge of socio-cultural conventions and practices required for living and working in a foreign country. Knows some of the differences between his/her own culture and the target culture, and attempts to adjust behavior and linguistic use accordingly as required in the above areas. Can get in, go through, and get out of most routine and everyday social situations. |
| 3 | Professional level intercultural competence | [individual] has sufficient intercultural and socio-linguistic knowledge, skills, and abilities to work in an international professional career setting. Uses these skills to adjust his/her behavior appropriately and rapidly in situations unusual or previously not encountered both in career or social settings by taking into account cultural differences. |
| 4 | Distinguished level intercultural competence | [individual] understands, negotiates, navigates, and operates in almost all inter-culturally challenging situations with a very broad perspective and flexibility. |
| 5 | Fully acculturated high level intercultural competence | [individual] has full mastery and competence in both formal and informal registers in dealing all possible intercultural situations with utmost effectiveness. |

TABLE 3-continued

Level of Fidelity
Levels of Fidelity

| Value | Definition |
|---|---|
| 4 | Precise representation of the culture parameter is not essential for a culturally accurate scenario task training |
| 5 | Precise representation of the cultural parameter is essential and must be included for a culturally accurate scenario task training |

Once determined, the parameters and parameter values 1110 are used to populate a particular task requirement model 1040 according to the particular configuration of the output platform (including hardware and software capabilities, operating system specifications, software installations, processing power, memory, storage, etc.), and according to any user preferences. Since the parameters and parameter values 1110 are configured according to particular task requirements in a particular application and required output, this system architecture may be platform-independent. Output deployment formats may, in some aspects, range from Software as a Service (SaaS) capabilities to autonomous, locally-installed software packages. As such, the output may be provided to the end user via software application and/or interface (i.e., web/network delivered or hosted on a local machine) In some instances, the intended deployment platform or output format may affect certain resolution factors, such as LOF, and/or otherwise affect some other decisions in the process. The output format of the populated model may be dynamic, ranging, for example, from a pdf format document or printable sheet in a simplistic form, to a specifically-built presentation mechanism or software package provided in a complex format. The delivered output may also be provided via a stand-alone reader or a web-delivered service.

In some aspects, the parameters and parameter values 1110 (i.e., the contextual characteristics) may incompletely populate the task requirement model 1040 and thus define a gap. In such instances, the computer system 1000 may further comprise an extrapolation processing device 1300 configured to extrapolate between relevant contextual characteristics (i.e., relevant parameters and associated parameter values 1110) to determine an approximated contextual characteristic for filling the gap. In such instances, the gap analysis may incorporate previously unknown or unutilized informed sources, including generating parameters to accommodate the new informed source. The gap analysis may also be used to determine a level of completeness (in some instances, with an associated criticality measure) compared to a baseline anticipated level of robustness of the populated model before the populated model is output to the user. Such a gap analysis allows the user to determine if enough critical information has been included to satisfy task goals or parameters, or whether additional data is needed to improve or complete the parameter set (parameters and parameter values 1110) for the particular task requirement model 1040. The extrapolation procedure, or any other suitable form of approximation, thus facilitates situations for which there can be no 100% solution, and explicit information may not necessarily be available. The extrapolation/approximation/estimation procedure can, in some aspects, be extended to broader cultural and regional features for behaviors and responses, to provide as accurate a representation of specific cultural nuances as possible. In one aspect, the gap analysis may include the determination of a ratio of completion of the task requirement model as an output component, wherein such a ratio may compare a sum of actual relevant parameters (and associated parameter values) being output to an optimal sum of parameters (and associated parameter values) which could be output. Such an optimal sum may be determined by a regression line produced by comparing parameter gains or losses between different levels of resolution such as, for example, different levels of fidelity. This ratio may be provided (i.e., via task requirement interface 1100 or in any other suitable manner) to a human or automated analyst, including the user, who may then determine whether the ratio is acceptable for the particular application as it relates to the task requirement model 1040.

In some aspects, the computer system 1000 may also comprise a compilation processing device 1250 configured to compile scenario data element identifiers 1085 and scenario resolution factors 1090 (from the database 1600) correlated with the respective task requirement identifiers 1030 and task requirement resolution factors 1070 associated with the parsed task requirements 1020 to determine the contextual characteristics having categories, attributes, and parameters and parameter values 1110 associated with the correlated scenario data element identifiers 1030 and scenario resolution factors 1070, wherein the contextual characteristics cooperate to populate the task requirement model 1040. In this regard, the categories, attributes, and parameters and parameter values associated with the contextual characteristics provide a hierarchical organization of parameter values with respect to the structure of the system 100. For example, particular categories which are appropriate with respect to application tasks are selected and input, in some instances with direction from informed sources. These informed sources of input may include cultural, linguistic, psychological, sociological, behavioral and application-specific subject matter experts, researchers, scientists, and existing research and relevant data sets. These categories may further include respective attributes, wherein, depending on the category, the attributes may be related to or associated with communication, linguistics, behaviors, or other psychological and sociological phenomena. Once the attributes in a category have been established, the parameters of each attribute are defined using input from informed sources. That is, parameters may be defined by informed sources in the specific language and/or culture to capture a specific aspect of the attribute for which parameters can be defined (i.e., define a range of behavior and/or language instantiations tied to that parameter, and by relation, to the hierarchically associated attribute and category), while parameter values provide specific aspects of behavior and/or language. In some instances, this hierarchical structure facilitates an appropriate categorization of the parameters and parameter values which, in turn, facilitates efficient extraction from the database 1600 and database normalization. In addition, appropriate social dimensions of cultural identity may be determined for focusing the database query with respect to the analysis. An example of the category, attribute, parameter, and parameter value hierarchy is shown below in Table 4:

TABLE 4

Category, Attribute, Parameter, and Parameter Value Relationship Example

| Categories | Attributes | Parameters | Parameter Values |
|---|---|---|---|
| Etiquette | Hand Gestures | Angry Hand Gestures | Point Hand at Person |
| Values & attitudes | Physical Interaction | Friendly Hand Gestures | Clench One Fist |
| Discourse Functions | Conversation Style | Formal Hand Gestures | Clench Both Fists |
| Indirect Communication Methods | Forms of Address | Informal Hand Gestures | Throw a Punch |

According to another aspect, which involves the formation, population, and maintenance of the database 1600, the computer system 1000 may further comprise a database processing device 1300 configured to populate the database 1600 with scenario data elements comprising, for example, the parameters and parameter values 1110 previously disclosed. More particularly, the database processing device 1300 is configured to parse each a plurality of scenario samples 1400 into parsed portions 1420; associate each parsed portion of the scenario sample with a scenario resolution factor 1085 comprising a category, an attribute associated with the category, and a parameter and parameter value associated with the attribute, to form the scenario data element 1440. The database processing device 1300 may be further configured to associate a scenario data element identifier 1090 with each scenario data element 1440, and to compile the scenario data elements 1440 into the database 1600. As such, the database 1600 may, in some instances, be characterized as a referential database of parameters, which are organized and tagged with particular categories and attributes, and are extractable according to metadata associating a given parameter with an entry in the scenario task dictionary 1060, and thus to particular scenario task requirements 1020. More particularly, the database 1600 includes metadata relating parameters to metadata configured, for example, to link cultural features to parsed task requirements 1020, wherein such metadata may include, for instance, region, culture, category, attribute, LOI/LOF/IPL and other selection criteria and resolution factors. New parameters/entries may be generated each time a gap (i.e., an application task, condition or capability for which no extant parameter could retrieve relevant data from the database 1600) is identified in the database 1600 through the aforementioned gap analysis. In some aspects, each parameter in the database 1600 may be tagged with one or more task requirements 1020 which are congruent to such task requirements associated with the scenario task dictionary 1060.

When task requirements 1020 are mined from the scenario task 1010 using the scenario task dictionary 1060, a list of the task requirements is generated and may be stored as an array. Since each parameter is tagged as with an identifier, appropriate parameters may be selected according to task needs associated with the scenario task 1010. The parameter may also be tagged with meta-information such as region, culture, category, attribute, LOI/LOF/IPL, and therefore can be down-selected such that each parameter is relevant, useful and able to be output in the deployment environment. In some aspects, a tag interleaving procedure developed from informed sources may be implemented to integrate disparate tag models to correlate "hard data" from the data source with system-appropriate meta- and data tags. Such integration may allow, for instance, extraction of "hard data" from the data source as particular parameter values.

As disclosed herein, the parameter values included in the database 1600 may be determined from various sources, including, for example, subject matter experts, research literature, current data sources, and current television, radio, Internet, and newspaper information. The meta-tag and resolution structure may further facilitate interleaving of disparate data sources and a standardized structure for parameter extraction from the database 1600, since the data sources may not necessarily share common tagging structures and thus may not be implemented in conjunction with each other, without interleaving, structural translation, or other form of standardization. Parameters may be tagged with various metadata (scenario data element identifiers 1085 and/or scenario resolution factors 1090) to facilitate tracking and filtering, wherein such metadata may include, for instance, time stamps, data source identifiers, and other categorical descriptors, similar to the data association protocol associated with the entries in the scenario task dictionary 1060.

In some aspects, the meta-tagging process may also include the assignment of dynamic attributes in conjunction with or instead of scenario data element identifiers 1085 and scenario resolution factors 1090. These dynamic attributes may determine, for example, specific temporal requirements of the data, including: "time-to-live", "automatically updated", and "automatically remove", and may also facilitate the subsequent models to be updated with new and/or changing data to provides the most current and most accurate information. Resolution factors such as LOI, LOF and IPL may be assigned using, for example, a standard Likert scale and may also represent dynamic aspects of attributes and parameters to as to provide the ability to select data according to specific architectural or structural needs in the instance of variation by language, culture, and/or application. A particular LOI may be assigned to each attribute by informed sources in the specific field of expertise (e.g. sociology, linguistics, etc), denotes the cultural or mission relevancy of a given parameter (i.e., including an importance element and/or cultural accuracy contribution element), and may be used in the process of down-selecting parameters from the database 1600 or associated categories and attributes. A particular LOF may be assigned to each parameter by informed sources in the specific field of expertise (e.g. virtual environments, distributed learning, etc), denotes the appropriate level of output fidelity of a given parameter (i.e., including a cultural accuracy precision element), and may be used in the process of down-selecting parameters from the database 1600 or associated categories and attributes. For example, fidelity levels for a generated scenario may include over-flying a city (LOF 1), entering the city (LOF 2), securing specific neighborhoods (LOF 3), manning check points or conducting joint patrols (LOF 4), and engaging local populations (LOF 5). A particular IPL is assigned to each parameter by informed sources in the specific domain field (e.g. Arabic rural culture, Chinese urban culture, etc), denotes the appropriate level of intercultural proficiency required to recognize and address a given parameter or parameter value group (i.e., including a required intercultural proficiency element), and may be used in the process of down-selecting parameters from the database 1600 or associated categories and attributes. Parameters and associated parameter values 1110 may thus be extracted from the database 1600 using an algorithm derived from one or more of a user profile, LOI, LOF and IPL settings, and/or scenario task 1010 or mission object/purpose input.

In still further aspects, a user profile may be selected or otherwise determined in order to provide a default information template. For instance, a commander of an organization at the strategic level of war requires a broadly different set of information than a commander for an organization operating at the tactical level of war. LOIs, LOFs, IPLs and other data selection criteria must thus be dynamic and capable of modification according to the particular user and associated specifications, and the resulting output is desirably customizable to the end user to provide information efficiently and avoid "information overload" or the lack of sufficient information. User profiles may therefore, in some instances, provide a default template for provided information, and incorporating LOI, LOF and IPL to customize the resulting output to particular user needs, while facilitating retention of data and system integrity.

Aspects of the tools and interfaces disclosed herein may thus allow a user to dynamically change aspects of the scenario task in order to modify the resulting output. For example, if the user chooses to modify the scenario task by changing conditions from daytime to nighttime operations, the resulting output will be appropriately shifted to provide culturally relevant parameters associated with nighttime operations (e.g., fewer people on the streets, fewer cars, or less noise). Aspects of the structure may also provide an outline of the parameters necessary for scenario task scripting and implementation, a framework for all feature instantiation, and a scalable model of required fidelity. In this manner, parameter extraction and culture module generation may be facilitated by establishing known perfunctory components and cross-cultural norms; e.g. basic human responses to certain stimuli, which allows for efficient transferability between scenario tasks and cultures. Culture-specific parameters may also provide scenario task-based data sets having parameters with the required LOF. Cultural behaviors and responses may be approximated when explicit information is not available, by extrapolating broader cultural and regional features, to provide as accurate a representation of specific cultural nuances as possible. The determined parameters can then populate a culture module comprising a collection of parameter values organized by parameters determined by scenario task requirements and levels of importance and fidelity that are selectable by the user for scripting the scenario task 1010.

Parameters values may be established through various sources, including subject matter experts, research literature, and current information obtained from a range of sources, including TV, radio, Internet, and newspapers. For example, a parameter might point to 'spatial relations between pairs of communicators' and the values in that parameter could range from '6 inches' to '20 feet', which would be established for specific situations, such as 'close friend' or 'possible enemy combatant'. Parameter values which are individual behavioral, linguistic or other cultural features may be grouped under one parameter. For example, the parameter "Angry Hand Gestures" might include the parameter values of "pointing a specific finger at a person," "clenching one fist," "clenching both fists," or "throwing a punch." Populating parameters and parameter values requires sorting the input of informed sources and external data according to categories and attributes, as disclosed herein.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. A computer system for analyzing a scenario task to determine contextual characteristics thereof, said system comprising:
   a processor including:
      an analytical processing component configured to parse a scenario task into parsed task requirements, the scenario task being at least partially associated with a cultural group of human subjects;
      an associative processing component configured to receive the parsed task requirements and to:
         associate a task requirement identifier with each parsed task requirement;
         associate each parsed task requirement with a task requirement resolution factor; and
         associate the task requirement identifiers to define a task requirement model;
      a correlative processing component configured to correlate the task requirement model with a database of scenario data elements, each scenario data element having one of a scenario data element identifier and a scenario resolution factor associated therewith, by correlating one of the task requirement identifiers and the task requirement resolution factors with the respective one of the scenario data element identifiers and the scenario resolution factors; and
      a compilation processing component configured to compile the correlated scenario data element identifiers and scenario resolution factors to form contextual characteristics having a hierarchical structure, the hierarchical structure having a plurality of categories, each category being defined by at least one attribute, wherein each attribute includes at least one parameter, with each parameter having a parameter value, the categories, attributes, parameters, and parameter values being associated with the correlated scenario data element identifiers and scenario resolution factors, the contextual characteristics cooperating to populate and provide context to the task requirement model.

2. A system according to claim 1, wherein the analytical processing component of the processor is further configured to parse a scenario task including at least one of a linguistic element, a cultural element, a communication, an interaction, a condition, an environment, a purpose, and an effect.

3. A system according to claim 1, wherein the associative processing component of the processor is further configured to associate each parsed task requirement of the scenario task with one of an importance level factor, a fidelity level factor, and an intercultural fidelity level factor.

4. A system according to claim 1, wherein the associative processing component of the processor is further configured to associate each parsed task requirement with a task requirement resolution factor associated with a projected information requirement level.

5. A system according to claim 1, wherein the contextual characteristics incompletely populate the task requirement model and define a gap, and the processor of the system further comprises an extrapolation processing component configured to extrapolate between relevant contextual characteristics to determine an approximated contextual characteristic for filling the gap.

6. A system according to claim 1, wherein the processor of the system further comprises a database processing component configured to form the database of scenario data elements by:
   parsing a scenario sample into parsed portions, the scenario sample being associated with a cultural group of human subjects;
   associating each parsed portion of the scenario sample with a scenario resolution factor having a hierarchical structure, the hierarchical structure having a plurality of categories, each category being defined by at least one attribute, wherein each attribute includes at least one parameter, with each parameter having a parameter value, so as to form the scenario data element;
   associating a scenario data element identifier with each scenario data element; and
   compiling the scenario data elements into the database.

7. A system according to claim 6, wherein the database processing component of the processor is further configured to parse a scenario sample including at least one of a linguistic element, a cultural element, a communication, an interaction, a condition, an environment, a purpose, and an effect.

8. A system according to claim 6, wherein the database processing component of the processor is further configured to associate each parsed portion of the scenario sample with one of an importance level factor, a fidelity level factor, and an intercultural fidelity level factor.

9. A system according to claim 8, wherein the database processing component of the processor is further configured to associate each parsed portion of the scenario sample with an importance level factor associated with an importance element and cultural accuracy contribution element.

10. A system according to claim 8, wherein the database processing component of the processor is further configured to associate each parsed portion of the scenario sample with a fidelity level factor associated with a cultural accuracy precision element.

11. A system according to claim 8, wherein the database processing component of the processor is further configured to associate each parsed portion of the scenario sample with an intercultural fidelity level factor associated with a required intercultural proficiency element.

12. A method of analyzing a scenario task to deteimine contextual characteristics thereof, said method comprising:
   parsing a scenario task into parsed task requirements, the scenario task being at least partially associated with a cultural group of human subjects;
   associating a task requirement identifier with each parsed task requirement;
   associating each parsed task requirement with a task requirement resolution factor;
   associating the task requirement identifiers to define a task requirement model;
   correlating the task requirement model with a database of scenario data elements, each scenario data element having one of a scenario data element identifier and a scenario resolution factor associated therewith, by correlating one of the task requirement identifiers and the task requirement resolution factors with the respective one of the scenario data element identifiers and the scenario resolution factors; and
   compiling the correlated scenario data element identifiers and scenario resolution factors to form contextual characteristics having a hierarchical structure, the hierarchical structure having a plurality of categories, each category being defined by at least one attribute, wherein each attribute includes at least one parameter, with each parameter having a parameter value, the categories, attributes, parameters, and parameter values being associated with the correlated scenario data element identifiers and scenario resolution factors, the contextual characteristics cooperating to populate and provide context to the task requirement model.

13. A method according to claim 12, wherein parsing a scenario task further comprises parsing a scenario task including at least one of a linguistic element, a cultural element, a communication, an interaction, a condition, an environment, a purpose, and an effect.

14. A method according to claim 12, wherein associating each parsed task requirement with a task requirement resolution factor further comprises associating each parsed task requirement of the scenario task with one of an importance level factor, a fidelity level factor, and an intercultural fidelity level factor.

15. A method according to claim 12, wherein associating each parsed task requirement with a task requirement resolution factor further comprises associating each parsed task requirement with a task requirement resolution factor associated with a projected information requirement level.

16. A method according to claim 12, wherein the contextual characteristics incompletely populate the task requirement model and define a gap, and the method further comprises extrapolating between relevant contextual characteristics to determine an approximated contextual characteristic for filling the gap.

17. A method according to claim 12, further comprising forming the database of scenario data elements by:
   parsing a scenario sample into parsed portions, the scenario sample being associated with a cultural group of human subjects;
   associating each parsed portion of the scenario sample with a scenario resolution factor having a hierarchical structure, the hierarchical structure having a plurality of categories, each category being defined by at least one attribute, wherein each attribute includes at least one parameter, with each parameter having a parameter value, so as to form the scenario data element;
   associating a scenario data element identifier with each scenario data element; and
   compiling the scenario data elements into the database.

18. A method according to claim 17, wherein parsing a scenario sample further comprises parsing a scenario sample including at least one of a linguistic element, a cultural element, a communication, an interaction, a condition, an environment, a purpose, and an effect.

19. A method according to claim 17, wherein associating each parsed portion of the scenario sample with a scenario resolution factor further comprises associating each parsed portion of the scenario sample with one of an importance level factor, a fidelity level factor, and an intercultural fidelity level factor.

20. A method according to claim 19, wherein associating each parsed portion of the scenario sample with an importance level factor further comprises associating each parsed portion of the scenario sample with an importance level factor associated with an importance element and cultural accuracy contribution element.

21. A method according to claim 19, wherein associating each parsed portion of the scenario sample with a fidelity level factor further comprises associating each parsed portion of the scenario sample with a fidelity level factor associated with a cultural accuracy precision element.

22. A method according to claim 19, wherein associating each parsed portion of the scenario sample with an intercultural fidelity level factor further comprises associating each parsed portion of the scenario sample with an intercultural fidelity level factor associated with a required intercultural proficiency element.

\* \* \* \* \*